United States Patent
Rulkens et al.

(10) Patent No.: US 9,428,612 B2
(45) Date of Patent: Aug. 30, 2016

(54) SEMI-CRYSTALLINE SEMI-AROMATIC POLYAMIDE

(75) Inventors: Rudy Rulkens, Cadier en Keer (NL); Robert C. B. Crombach, Kerkrade (NL)

(73) Assignee: DSM IP ASSETS B.V., Heerlen (NL)

( * ) Notice: Subject to any disclaimer, the term of this patent is extended or adjusted under 35 U.S.C. 154(b) by 361 days.

(21) Appl. No.: 12/161,602

(22) PCT Filed: Jan. 23, 2007

(86) PCT No.: PCT/EP2007/000529
§ 371 (c)(1),
(2), (4) Date: Dec. 9, 2008

(87) PCT Pub. No.: WO2007/085406
PCT Pub. Date: Aug. 2, 2007

(65) Prior Publication Data
US 2010/0063245 A1 Mar. 11, 2010

(30) Foreign Application Priority Data

Jan. 26, 2006 (EP) .................................... 06075293

(51) Int. Cl.
*C08G 69/32* (2006.01)
*C08G 69/26* (2006.01)
*C08G 81/02* (2006.01)
*C08L 77/06* (2006.01)
*C08G 69/02* (2006.01)

(52) U.S. Cl.
CPC .............. *C08G 69/265* (2013.01); *C08G 69/02* (2013.01); *C08G 69/26* (2013.01); *C08G 81/028* (2013.01); *C08L 77/06* (2013.01)

(58) Field of Classification Search
CPC ...... C08L 77/06; C08G 69/26; C08G 81/028
USPC ....... 528/310, 170, 322, 323, 335, 336, 332, 528/339, 340, 347
See application file for complete search history.

(56) References Cited

U.S. PATENT DOCUMENTS

| | | | |
|---|---|---|---|
| 4,719,284 A | 1/1988 | Nielinger et al. | |
| 4,868,280 A | 9/1989 | Gaymans et al. | |
| 5,030,709 A * | 7/1991 | Pipper et al. | 528/324 |
| 5,763,561 A * | 6/1998 | Keske | 528/310 |
| 5,849,826 A * | 12/1998 | Ogo et al. | 524/410 |
| 6,140,459 A | 10/2000 | Leboeuf et al. | |
| 6,414,064 B1 | 7/2002 | Matsuoka et al. | |
| 6,747,120 B2 | 6/2004 | Rulkens et al. | |
| 2002/0040089 A1 | 4/2002 | Ouchi | |
| 2003/0044710 A1 | 3/2003 | Horikoshi et al. | |
| 2007/0133007 A1 | 6/2007 | Schmidt et al. | |

FOREIGN PATENT DOCUMENTS

| | | |
|---|---|---|
| EP | 0 540 890 | 5/1993 |
| JP | 07-224164 | 8/1995 |
| JP | 2002-138197 | 5/2002 |
| JP | 2003-292613 | 10/2003 |
| JP | 2007-224164 | 9/2007 |
| JP | 2008-134207 | 6/2008 |
| JP | 2009-003215 | 1/2009 |
| TW | 521082 | 9/2000 |
| WO | 2006/135841 | 12/2006 |

OTHER PUBLICATIONS

International Search Report for PCT/EP2007/000529 mailed Mar. 16, 2007.
Written Opinion for PCT/EP2007/000529 mailed Mar. 16, 2007.
R.J. Gaymans, *J.Poly.Sci.*, Polymer Chemistry Edition, vol. 23, 1599-1605 (1985).

* cited by examiner

*Primary Examiner* — Gregory Listvoyb
(74) *Attorney, Agent, or Firm* — Nixon & Vanderhye P.C.

(57) ABSTRACT

The invention relates to a semi-crystalline semi-aromatic polyamide comprising A-A-B-B units derived from (a) dicarboxylic acids consisting of a mixture of aromatic dicarboxylic acid and aliphatic dicarboxylic acid and (b) diamines consisting of a mixture of long chain aliphatic diamine and short chain aliphatic diamine, wherein (a-i) the aromatic dicarboxylic acid consists for at least 80 mole % of terephthalic acid, and (a-ii) the aliphatic dicarboxylic acid constitutes at least 5 mole % of the dicarboxylic acids, (b-i) the short chain aliphatic diamine constitutes at least 10 mole % of the diamines, and (c) the aromatic dicarboxylic acid and the long chain aliphatic diamine constitute 60-90 mole % of the total molar amount of dicarboxylic acids and diamines.

10 Claims, No Drawings

SEMI-CRYSTALLINE SEMI-AROMATIC POLYAMIDE

This application is the U.S. national phase of International Application No. PCT/EP2007/000529 filed 23 Jan. 2007 which designated the U.S. and claims priority to European Patent Application No. 06075293.8 filed 26 Jan. 2006, the entire contents of each of which are hereby incorporated by reference.

The invention relates to a semi-crystalline semi-aromatic polyamide, more particular to a semi-crystalline semi-aromatic polyamide comprising units derived from diamines (A-A units) comprising aliphatic diamine and from dicarboxylic acids (B-B units) comprising terephthalic acid.

Semi-crystalline semi-aromatic polyamides are used in particular for injection-moulded parts intended for applications wherein the parts are exposed to high temperatures. Exposure to such high temperatures may be for shorter or longer periods, and/or at variable time intervals as well as also incidentally to very high peak temperatures, all depending on the type of application. Depending on the applications the polyamides have to comply with different requirements. Semi-crystalline semi-aromatic polyamides are used for example in automotive and electronics applications where mechanical properties and requirements on good dimensional stability under hot humid conditions are vital. The polymers must have a sufficiently high crystallinity to allow for good mechanical properties for example retaining a high stiffness above Tg up to Tm. Polymers that are suitable for such applications not only need to have a high melting temperature (Tm), and likewise also a high glass transition temperature (Tg), for the neat polymer, but also retention of the properties after being subjected to humid conditions. For example, for electronic application, where moulded parts are mounted by processes like surface mounting technologies (SMT), the materials need to have a high blistering resistance also after being subjected to humid conditions (se, for example, Polyamide, Kunststoff Handbuch 3/4 Becker/Braun (Ed.), Hanser Verlag (München), 1998, ISBN 3-446-16486-3, pages 617 and 809). Next to the high melting temperatures, these polymers must also have a good thermal stability in the melt, to enable melt processing for making injection-moulded parts on an economic industrial scale.

Examples of semi-crystalline semi-aromatic polyamides include homopolyamides such as polyamide 6T, i.e. the polyamide derived from terephthalic acid and hexamethylene diamine (synonym for 1,6-hexanediamine), and polyamide 4T, i.e. the polyamide derived from terephthalic acid and 1,4-butane diamine. Polyamide 6T is a semi-aromatic, semi-crystalline polyamide with a melting point of about 370° C., whereas the melting point of polyamide 4T is well above 400° C. Since the melting point of polyamide 6T and polyamide 4T are higher than the decomposition temperatures of the respective polyamides, these polyamides are not melt-processable and therefore not suitable for the production of moulded polyamide parts via for example injection-moulding. To overcome that problem, the semi-aromatic polyamides used as engineering plastics in injection moulding applications are mostly copolyamides. Copolyamides typically have melting points that are lower than the melting points of the corresponding semi-aromatic homopolyamides, which makes the copolyamides better melt-processable than the corresponding semi-aromatic homopolyamides. Such semi-aromatic polyamides are known from U.S. Pat. No. 6,747,120. In U.S. Pat. No. 6,747,120, polyamide 6T/4T, which is a copolyamide of the homopolyamides polyamide 6T and polyamide 4T, is described. A problem of polyamide 6T/4T is that under standard processing conditions it is difficult to prepare such a polyamide with sufficiently high molecular weight and sufficiently high viscosity for various applications. Though it is mentioned in U.S. Pat. No. 6,747,120 that higher molecular weights, and thereby higher viscosities, may be achieved by using acid or amine monomers with functionalities of 3 and higher, the use of such monomers also introduces the risk of crosslinking and gellation of the polyamide, during polymerisation and/or during melt processing.

Another class of semi-aromatic polyamides is described by R. J. Gaymans and S. Aalto in J. Pol. Sci. A: Pol. Chem. Vol. 27 pp 423-430 (1989). Gaymans and Aalto mention the preparation and properties of polyamide 46/4T, i.e. copolyamides of polyamide 46 and polyamide 4T. These copolyamides also have the problem that under standard processing conditions polyamide polymers of low molecular weights are obtained, in particular with increasing polyamide 4T content Another problem is that these copolyamides have limited melt stability. In case of a medium to high content of polyamide 4T components, these polyamides show a secondary melting peak at or above 350° C., next to a lower, primary melting point, which secondary melting peak complicates or even completely impedes melt processing. A further problem is that these copolyamides show a large drop in melting temperature under humid conditions, resulting in a strongly reduced blister resistance in an SMT process, after being subjected to a warm humid climate, in particular when the content of polyamide 46 components is high.

The object of the present invention is to provide a heat resistant melt-processable polyamide that does not show the aforementioned disadvantages, or shows them to a lesser extent. The polyamide must have a high melting temperature as well as high melt stability, good mechanical properties, a good blister resistance and a limited drop in melting temperature under humid conditions. More particular, the inventions aims to provide a semi-aromatic polyamide that can be prepared under standard processing conditions, and which semi-aromatic polyamide can be obtained with a higher viscosity than polyamide 46/4T or polyamide 6T/4T can be obtained under such conditions, has a high melting temperature and at the same time an improved melt stability and blister behaviour compared to polyamide 46/4T with a high polyamide 46 content.

This object has been achieved with the semi-crystalline semi-aromatic polyamide according to the invention, wherein a. the dicarboxylic acids consist of a mixture of aromatic dicarboxylic acid and aliphatic dicarboxylic acid, wherein
   i. the aromatic dicarboxylic acid consists for at least 80 mole % of terephthalic acid, relative to the total amount of aromatic dicarboxylic acid, and
   ii. the molar amount of the aliphatic dicarboxylic acid is at least 5 mole %, relative to the total molar amount of dicarboxylic acids,
b. the diamines consist of a mixture of long chain aliphatic diamine (C6-C12) and short chain aliphatic diamine (C2-C5), wherein the molar amount of the short chain aliphatic diamine is at least 10 mole %, relative to the total molar amount of diamines, and
c. the sum of the molar amount of the aromatic dicarboxylic acid and the long chain aliphatic diamine is 60-90 mole %, relative to the total molar amount of dicarboxylic acids and diamines.

The effect of these measures is that the aforementioned disadvantages have been overcome. The polyamide according to the invention can more easily be prepared with a high viscosities, i.e. under more modest process conditions and/or shorter processing times, than both polyamide 46/4T and polyamide 6T/4T, and can also be prepared with higher viscosities even without the use of higher functional starting components. The semi-aromatic semi-crystalline polyamide according to the invention, despite that it is derived from a complex mixture of dicarboxylic acids and diamines, still has a high melting point and at the same time a high crystallinity, More particularly, the crystallinity is at a similar level as the crystallinity of copolyamides like polyamide 46/4T and polyamide 6T/4T, whereas the melting point is comparable with or only slightly lower than these copolyamides. Altogether this is surprising since it is known per se that the melting temperature of a semi-crystalline, semi-aromatic polyamide can be lowered drastically by turning it into a copolymer; see for example Chapter 6 in Polyamide, Kunststoff Handbuch 3/4, Becker/Braun (Ed.), Hanser Verlag (München), 1998, ISBN 3-446-16486-3. This manual teaches that a monomer unit of a different polymer with a lower melting point is usually chosen to lower the melting point of a semi-crystalline polymer, and that a decrease in the melting point is often accompanied by a substantial, or even complete, loss of crystallinity, in particular at higher comonomer contents (in the order of 30-70 mol %), unless isomorphic monomer units (see also Polyamide, Kunststoff Handbuch 3/4 Becker/Braun (Ed.), Hanser Verlag (München), 1998, ISBN 3-446-16486-3 p 8-9) are used. In addition, the polyamide according to the invention shows a much smaller drop in melting temperature under humid conditions than polyamide 46/4T, and even smaller than polyamide 6T/4T, thereby resulting in a good blistering resistance.

This advantage is also reflected by the water diffusion behaviour. It has been observed that the diffusion rate in general increases with decreasing melting temperature of the copolyamide. However, it has also been observed that the copolyamide according to the invention shows a lower diffusion rate than polyamide 46/4T or polyamide 6T/4T with a corresponding melting temperature, or shows a similar diffusion rate while having a lower melting temperature. This has the advantage that the copolyamide according to the invention not only has a better blistering resistance under saturation conditions, but also that the maximum allowable storage time under humid conditions before blistering occurs during the soldering process of the said polyamide is increased compared to polyamide 46/4T or polyamide 6T/4T products with comparable melting temperature. That this result is very surprising becomes in particular evident, if one considers that the copolymers can be regarded as a combination of a copolyamide of two polyamides, for example as a combination of polyamide 6T/4T and polyamide 46. It shows that replacement of part of the polyamide 4T in polyamide 6T/4T by polyamide 46 for making such combination, the melting temperature drops, whereas the diffusion remains at a very low level, and the extent of an increase, if any is by far less than could be accounted for on a weight basis for the high diffusion value of Polyamide 46.

A further advantage is that the copolyamide according to the invention has a higher Tg compared to PA46/4T copolyamides or PA66/6T copolyamides having a corresponding melting temperature. While it has been observed that the Tg of copolyamides increases with increasing melting temperature, it has also been observed that the increase is larger with the copolyamide according to the invention, compared to PA46/4T copolyamides and PA66/6T copolyamides. For melt processing of polyamides the melting temperature preferably is not too high, whereas for retention of mechanical properties at elevated temperature a higher Tg is preferred. Therefore, the copolyamide according to the invention has the advantage, compared to the PA46/4T copolyamides and PA66/6T copolyamides, that either the mechanical properties are retained up to higher temperatures, while having the same melting temperature, or that the mechanical properties are retained up to the same temperature, while having a lower melting temperature.

Furthermore, the semi-aromatic semi-crystalline polyamide according to the invention has an improved melt stability compared to a polyamide 46/4T with a comparable high melting point.

In the context of this application a 'semi-aromatic polyamide' is understood to be a homo- or copolyamide that contains units derived from a combination of aromatic and aliphatic components, such as aliphatic dicarboxylic acids and aromatic diamines or aromatic dicarboxylic acids and aliphatic diamines, or a combination thereof. Polyamides made from diamines and dicarboxylic acids are classified as AABB polymers, as is described for example in Nylon Plastic Handbook, Ed. M.I. Kohan, Hanser Publishers, Munich, ISBN 1-56990-189-9 (1995), page 5. Semi-crystalline polyamide are distinguished from amorphous polyamides in that semi-crystalline polyamides, when in the solid state, are characterized by a multiphase structure comprising crystalline domains next to amorphous domains. It is furthermore noted that for the nomenclature of the polyamides that are mentioned herein the standard convention is applied wherein the word polyamide is followed by a code consisting of a combination of numbers and or letters wherein the first number or letter refers to the diamine and the second number or letter refers to the diacid. In case of a copolyamide, wherein monomers of different homopolyamides are combined, the codes for the different homopolyamides are separated by a slash according to the ISO practice described in Nylon Plastic Handbook, Ed. M.I., Kohan, Hanser Publishers, Munich, ISBN 1-56990-189-9 (1995), page 5.

The semi-crystalline semi-aromatic polyamide according to the invention comprises copolyamides, most of which can be considered as terpolymers or even higher copolyamides, i.e. comprising monomer compositions representing 3 or more homopolyamides. Representative examples of these terpolymers according to the invention are polyamide 6T/4T/46, [which is a copolyamide of polyamide 6T, polyamide 4T and polyamide 46], polyamide 6T/66/46, [being a copolyamide of polyamide 6T, polyamide 66 and polyamide 46], polyamide 6T/5T/56, [which is copolyamide of polyamide 6T, polyamide 5T and polyamide 56], and polyamide 6T/66/56 [i.e. a copolyamide of polyamide 6T, polyamide 66 and polyamide 56].

The effect of the measure of the invention resulting in the semi-crystalline semi-aromatic polyamide according to the invention having the above said improved properties are in particular surprising in view of the facts that the homopolyamides polyamide 46 and polyamide 56, in particular polyamide 46, have a limited melt stability and the production of these homopolyamides is normally accompanied with production of side products, such as cyclic monoamines, which can act as a chain stopper.

The semi-aromatic polyamide according to the invention comprises derived from aromatic dicarboxylic acid and aliphatic dicarboxylic acid and long chain aliphatic diamine and short chain aliphatic diamine. The units derived from diamines are denoted herein also as B-B units, whereas in analogy the units derived from dicarboxylic acids are denoted herein as B-B units. Further, the A-A units and B-B units are denoted together herein below also as A-A-B-B units.

The aromatic dicarboxylic acid consists for at least 80 mole % of terephthalic acid, relative to the total amount of aromatic dicarboxylic acid. Other suitable aromatic dicarboxylic acids that can be used in the polyamide according to the invention next to terephthalic acid are for example isophthalic acid or naphthalene dicarboxylic acid.

Suitable aliphatic dicarboxylic acid are, for example, aliphatic dicarboxylic acid with 6 to 18 carbon atoms, such as adipic acid (C6), 1,4-cyclohexane dicarboxylic acid (C8), suberic acid (C8), sebacic acid (C10), dodecanoic acid (C12) or a mixture thereof. Preferably, the aliphatic dicarboxylic acid is a C6-C10 aliphatic dicarboxylic acid, including adipic acid, sebacic acid or a mixture thereof, and more the aliphatic dicarboxylic acid is a C6-C8 aliphatic dicarboxylic acid. Most preferably the aliphatic dicarboxylic acid is adipic acid.

A "short chain diamine" is herein understood to be a diamine with 2-5 carbon atoms, or in other words the short chain aliphatic diamine is a C2-C5 aliphatic diamine. Examples of such diamines that can suitably be used in the polyamides according to the invention include 1,2-ethylene diamine, 1,3-propanediamine, 1,4-butanediamine and 1,5-pentane diamine, and mixtures thereof. Preferably, the short chain aliphatic diamine is chosen from the group consisting of 1,4-butanediamine, 1,5-pentane diamine and mixtures thereof, more preferably 1,4-butanediamine.

A long chain aliphatic diamine is herein understood to be a diamine with 6-12 C atoms, or in other words the long chain aliphatic diamine is a C6-C12 aliphatic diamine. The aliphatic chain in these diamines may be a straight chain, a branched chain, a cyclic structure and any combination thereof. Suitable long chain aliphatic diamines that can be used in the polyamide according to the invention are for example 2-methyl-1,5-pentanediamine (also known as 2-methylpentamethylene diamine), 1,5-hexanediamine, 1,6-hexane diamine, 1,4-cyclohexanediamine, 1,8-octanediamine, 2-methyl-1,8-octanediamine, 1,9-nonanediamine, trimethylhexamethylene diamine, 1,10-decane diamine, 1,11-undecanediamine, 1,12-dodecanediamine, m-xylylenediamine and p-xylylenediamine, and any mixture thereof. Preferably, the long chain aliphatic diamine is chosen from the group consisting of 1,6-hexane diamine, C8-diamine, 2-methyl-1,8-octanediamine, 1,9-nonanediamine, C10-diamine, and mixtures thereof, more preferably 1,6-hexane diamine. The advantage of this preferred choice, and in particular of the more preferred choice of 1,6-hexane diamine is that the high temperature properties of the copolyaniide according to the invention are even better.

Next to the A-A-B-B units derived from diamines (AA) and dicarboxylic acids (BB), the polyamide according to the invention may comprise units derived from other components, such as aliphatic aminocarboxylic acids (AB units) and the corresponding cyclic lactams, as well as small amounts of a branching agent and/or chain stoppers.

Preferably, the polyamide according to the invention comprises at most 10 mass %, more preferably at most 8 mass %, and still more preferably al most 5 mass %, relative to the total mass of the polyamide, of units derived from components other than dicarboxylic acids and diamines. Most preferably the polyamide according to the invention does not comprise such other components at all and consists only of A-A-B-B units derived from dicarboxylic acids and diamines. The advantage is a logistically simpler process and better crystalline properties.

Suitable lactams are for example laurolactam and epsilon-caprolactam. Suitable branching agents are, for example, trifunctional carboxylic acids, such as trimellitic acid, and trifunctional amines, such as bishexamethylentriamine (BHT). Suitable chain stoppers are monofunctional carboxylic acids, such as benzoic acid, and monofunctional amines. Branching agents as well as chain stoppers, if used at all, are preferably used in an amount for each of these components, of at most 1 mole %, more preferably at most 0.1 mole %, relative to the total molar amount of diamine and dicarboxylic acid.

Preferably, the aromatic dicarboxylic acid in the semi-aromatic polyamide according to the invention consists for at least 90 mole %, more preferably at least 95 mole %, of terephthalic acid, relative to the total molar amount of aromatic dicarboxylic acid. Ultimately, only terephthalic acid is used as the aromatic dicarboxylic acid. The advantage of use of terephthalic acid as the only aromatic dicarboxylic acid is that the polyamide has higher crystallinity, improved blister resistance and better property retention at elevated temperature.

In the polyamide according to the invention, the molar amount of the aliphatic dicarboxylic acid is at least 5 mole %, relative to the total amount of dicarboxylic acids, and the molar amount of the short chain aliphatic diamine is at least 10 mole %, relative to the total amount of diamines.

Although there is no explicit mentioning of the minimum amount of the aromatic dicarboxylic acid and the long chain aliphatic diamine, these amounts follow implicitly from the further requirement that the sum of the molar amount of the aromatic dicarboxylic acid and the long chain aliphatic diamine is 60-90 mole %, relative to the total molar amount of dicarboxylic acids and diamines. Implicitly, the amount of the aromatic dicarboxylic acid is at least 30 mole %, relative to the total amount of dicarboxylic acids, whereas the amount of the long chain aliphatic diamine is at least 25 mole %, relative to the total amount of diamines.

In other words, the dicarboxylic acid consist of 30-95 mole % of aromatic dicarboxylic acid and 70-5 mole % of aliphatic dicarboxylic acid, whereas the aliphatic diamines consist of 25-90 mole % long chain diamines and 75-10 mole % short chain diamines. It is noted that these ranges, wherein the composition of dicarboxylic acids and diamines may vary, are further restricted by the requirement of the sum of the molar amount of the aromatic dicarboxylic acid and the long chain aliphatic diamine being 60-90 mole %, relative to the total molar amount of dicarboxylic acids and diamines.

Preferably, the dicarboxylic acids consist for at least 30 mole % more preferably at least 35 mole % of aromatic dicarboxylic acid. Also preferably, the aliphatic diamines consist for at least 15 mole %, more preferably at least 20 mole % short chain diamine. The advantage of an increased amount of aromatic dicarboxylic acid, respectively short chain diamine, is that the high temperature properties are further increased.

Most preferably, the dicarboxylic acid consist of 50-85 mole % of aromatic dicarboxylic acid and 50-15 mole % of aliphatic dicarboxylic acid, the aliphatic diamines consist of 40-80 mole % long chain diamines and 60-20 mole % short chain diamines.

Also preferably, the molar amount of the short chain aliphatic diamine in the semi-aromatic polyamide according to the invention is at least 30 mole %, relative to the sum of the molar amount of the aliphatic dicarboxylic acid and the short chain aliphatic diamine. More preferably, this amount is at least 40 mole %, or at least 45 mole %, and still better at least 50 mole % or even at least 55 mole %. The higher the molar amount of the short chain aliphatic diamine the better is the thermal stability of the polyamide.

The molar amount of the short chain aliphatic diamine in the semi-aromatic polyamide according to the invention also is at most 75 mole %, relative to the molar amount of short chain and long chain diamines. Preferably, the molar amount of the short chain aliphatic diamine is at most 60 mole %, more preferably 50 mole %, 40 mole %, or even 35 mole % relative to the molar amount of short chain and long chain diamines. An advantage of the copolyamide with such a lower molar amount of the short chain diamine is that for the copolyamide with a given Tm the water diffusion behaviour improves.

It is further preferred that the sum of the molar amount of the aromatic dicarboxylic acid and the long chain aliphatic diamine is at least 65 mole %, preferably at least 70 mole % and more preferably at least 75 mole %, relative to the total molar amount of dicarboxylic acids and diamines. The advantage of the polyamide with the sum of the molar amount of the aromatic dicarboxylic acid and the long chain aliphatic diamine is higher is that the polyamide combines a higher melt temperature and higher crystallinity with a better thermal stability and melt processability. Suitably, the said sum is in the range of 70-85 mole %, or even 75-80 mole %, relative to the total molar amount of dicarboxylic acids and diamines.

In a preferred embodiment of the semi-aromatic polyamide according to the invention:
  at least 90 mole % of the aromatic dicarboxylic acid consists of terephthalic acid,
  at least 80 mole % of the aliphatic dicarboxylic acid consists of adipic acid,
  at least 80 mole % of the long chain aliphatic diamine consists of hexane diamine, C8-diamine, C9-diamine, C10-diamine and mixtures thereof, and
  at least 80 mole % of the short chain aliphatic diamine consists of 1,4-butanediamine.

In a more preferred embodiment
  at least 95 mole % of the aromatic dicarboxylic acid consists of terephthalic acid,
  at least 90 mole % of the aliphatic dicarboxylic acid consists of adipic acid,
  at least 90 mole % of the long chain aliphatic diamine consists of hexane diamine, C8-diamine, C9-diamine, C10-diamine and mixtures thereof, and
  at least 90 mole % of the short chain aliphatic diamine consists of 1,4-butanediamine.

Preferably, the semi-aromatic polyamide according to the invention is a terpolymer of 3 polyamides wherein the first polyamide is chosen from the group consisting of polyamide 6T, polyamide 8T, polyamide 9T, polyamide 10T and polyamide 12T, the second polymer is chosen from the group consisting of polyamide 66, polyamide 86, polyamide 96, polyamide 106 and polyamide 126 and the third polyamide is chosen from the group consisting of polyamide 4T and polyamide 5T.

More preferably, the semi-aromatic copolyamide is a terpolymer chosen from the group consisting of the terpolymers of polyamide 6T, polyamide 66 and polyamide 4T; polyamide 8T, polyamide 86 and polyamide 4T; polyamide 9T, polyamide 96 and polyamide 4T; and polyamide 10T, polyamide 106 and polyamide 4T. It is noted that terpolymers of may be nominated in different ways depending on the ratio of the respective monomers used in the polyamides. For example polyamide 6T/66/4T, i.e. the copolyamide polyamide 6T, polyamide 66 and polyamide 4T, might also be nominated as polyamide 6T/6T/46 or polyamide 6T/4T/46, depending on whether either the polyamide 66 is higher or lower than the polyamide 4T content.

The invention also relates to a process for the preparation of the semi-aromatic polyamide according to the invention comprising a polymerisation step wherein dicarboxylic acids comprising terephthalic acid and diamines comprising aliphatic diamine are cocondensed to form a polyamide comprising A-A-B-B units, and wherein the dicarboxylic acids and diamines have a composition described above.

The copolyamide according to the invention can be prepared in various ways known per se for the preparation of polyamides and copolymers thereof. Examples of suitable processes are for example described in Polyamide, Kunststoff Handbuch 3/4, Hanser Verlag (München), 1998, ISBN 3-446-16486-3.

The polymerisation may for example be performed as a solution phase process or as a melt phase process. Preferably, use is made of the process in which a mixture of the dicarboxylic acids, or esters or polyesters thereof, and diamines, to which mixture water and an excess amount of diamine are added, is polycondensed via the liquid phase to form a low molar mass copolyamide, with a relative viscosity of for example 1.03-1.80, measured in 96% sulphuric acid according to method to ISO 307, fourth edition. Such a process is for example known from S-5550208-A, EP-0393548-A and EP-0039524-A. This is followed by post-condensation in the solid phase under an inert gas, which may optionally contain steam and for diamine, until a copolyamide of the desired viscosity is obtained. The advantage of such a process is that the copolyamide is in the melt phase at high temperatures for only a short time, so that undesired side-reactions are minimised.

The conditions for the polymerisation, independent of the type of process that is applied, are suitably chosen such that the polyamide that is obtained with the process has a relative viscosity of for example more than 1.80, measured in 96% sulphuric acid according to method to ISO 307, fourth edition. Such polyamides give good mechanical properties.

Preferably, the copolyamide according to the invention has a relative viscosity of at least 1.90, and also preferably less than 6.0, more preferably in the range of 2.0-4.0 and still more preferably 2.1-3.5, measured in 96% sulphuric acid according to method to ISO 307, fourth edition.

It has further been found that for the polyamides according the invention, the relative viscosity might even be lower than 1.80, and might be as low as 1.7 or even as low as 1.6 while still retaining good mechanical properties. This is in contrast with the copolyamides 46/4T and 4T/6T. A polyamide with such a low viscosity, i.e. in the range of 1.6-1.8 measured in 96% sulphuric acid according to method to ISO 307, fourth edition, has the advantage that the flow during moulding is better and moulded parts with thinner elements can be made. Retention of mechanical properties is really important for such moulded parts.

The invention also relates to a polymer composition comprising a semi-aromatic polyamide according to the invention and at least one additive, and to the use of said semi-aromatic polyamide and the said polymer composition for making moulded polyamide parts, as well as to moulded polyamide parts made thereof.

The semi-aromatic polyamide according to the invention as well as the polyamide composition comprising said polyamide are eminently suitable for forming products from the melt, for example by means of injection-moulding, extrusion, blow moulding or compression moulding.

Additives that may be comprised in the said polyamide composition include the usual additives, known by the person skilled in the art of making polyamide moulding compositions. Suitable additives are, for example, stabilisers, such as UV stabilizers, heat stabilizers and antioxidants, colorants, processing aids, for example mould release agents and lubricants, flow improving additives, such as polyamide oligomers, agents for improving the impact resistance, fillers, reinforcing agents, such as carbon fibers and glass fibers, and flame retardants, such as halogen containing flame retardants, halogen free flame retardants and flame retardant synergists. The polyamide composition may optionally also contain polymers other than polyamides.

Suitably, the polyamide composition comprises the semi-aromatic polyamide in an amount of 20-99.99 wt. %, and at least one additive in an amount of 0.01-80 wt. %, relative to the total weight of the polyamide composition. Preferably, the amount of the at least one additive is 0.1-70 wt. %, more preferably, 1.0-60 wt. % or even 2-50 wt. %, relative to the total weight of the polyamide composition.

Products that can be obtained by using the semi-aromatic polyamide or the polyamide composition according to the invention are, for example, automotive engine parts, electric and electronic components, films and fibres.

Suitably, the moulded part comprising the semi-aromatic polyamide according to the invention or a polyamide composition comprising the same is used as automotive engine part, as an electric or electronic component, or in aerospace and household applications.

The invention will be further elucidated with reference to the following examples, and comparative experiments, without however being limited thereto.

Raw Materials

For the preparation of the polyamides described below, industrial grade materials were used.

EXAMPLE I

Preparation of PA-6T/46 (Mole Ratio 74.4/25.6)

A mixture of 136,25 g of tetramethylene diamine, 384.29 g hexamethylene diamine, 530 g water, 0.36 g sodium hypophosphite monohydrate, 166.20 g adipic acid and 549.27 g terephthalic acid was stirred in a 2.5 liter autoclave with heating and with removal of water by distillation. It is noted that in this and all further experiments a slight excess of tetramethylene diamine of about 2-4 wt. % has been used, compared to the composition of the calculated polyamide composition, to compensate for the loss of tetramethylene diamine during the preparation of the polyamide. After 27 minutes a 91 wt. % aqueous salt solution was obtained, while the temperature rose from 170° C. to 212° C. Then the autoclave was closed. The polymerisation was effected at increasing temperatures of 210° C. to 226° C. for 25 minutes, during which the pressure rose to 1.4 MPa, after which the autoclave's contents were flashed and the solid product was cooled further under nitrogen. The prepolymer thus obtained was subsequently dried in a drying kiln for several hours heating at 125° C. under vacuum and a stream of nitrogen of 0.02 MPa. The dried prepolymer was post-condensed in the solid phase in a metal tube reactor (d=85 mm) for several hours heating at 200° C. under a stream of nitrogen (2400 g/h) and then under a stream of nitrogen/water vapour (3/1 weight ratio, 2400 g/h)) for 2 hours at 225° C. and 46 hours at 260° C. Then the polymer was cooled to room temperature.

EXAMPLE II

Preparation of PA-6T/4T/46 (Mole Ratio 67.5/21.3/11.2)

In the same way as in Example I a mixture of 179.8 g tetramethylene diamine, 347.25 g hexamethylene diamine, 537 g water, 0.36 g sodium hypophosphite monohydrate, 72.36 g adipic acid and 653.38 g terephthalic acid was stirred in a 2.5 liter autoclave with heating so-that an 91 wt. % aqueous salt solution was obtained after 27 minutes. In this process the temperature increased from 169° C. to 223° C. The polymerisation was effected at increasing temperatures of 210° C. to 226° C. for 21 minutes, during which the pressure rose to 1.3 MPa. The prepolymer was subsequently dried and post-condensed in the solid phase in the same way as in Example I.

EXAMPLE III

Preparation of PA-6T/46/66 (Mole Ratio 67.5/11.2/21.31)

In the same way as in Example I a mixture of 57.77 g tetramethylene diamine, 454.24 g hexamethylene diamine, 498 g water, 0.36 g sodium hypophosphite monohydrate, 209.21 g adipic acid and 493.18 g terephthalic acid was stirred in a 2.5 liter autoclave with heating so-that an 91 wt. % aqueous salt solution was obtained after 17 minutes. In this process the temperature increased from 168° C. to 206° C. The polymerisation was effected at increasing temperatures of 210° C. to 226° C. for 25 minutes, during which the pressure rose to 1.4 MPa. The prepolymer was subsequently dried and post-condensed in the solid phase in the same way as in Example I except the post condensation time at 260° C. was 17 hours.

EXAMPLE IV

Preparation of PA-6T/4T/46 (Mole Ratio 60.0/21.3/18.7)

In the same way as in Example 1 a mixture of 218.26 g tetramethylene diamine, 312.95 g hexamethylene diamine, 540 g water, 0.36 g sodium hypophosphite monohydrate, 122.33 g adipic acid and 606.47 g terephthalic acid was stirred in a 2.5 liter autoclave with heating so-that an 90 wt. % aqueous salt solution was obtained after 22 minutes. In this process the temperature increased from 170° C. to 216° C. The polymerisation was effected at increasing temperatures of 210° C. to 226° C. for 25 minutes, during which the pressure rose to 1.5 MPa. The prepolymer was subsequently dried and post-condensed in the solid phase in the same way as in Example I, except the post condensation time at 225° C. was 5 hours.

EXAMPLE V

Preparation of PA-6T/46/66 (Mole Ratio 60.0/18.7/21.3)

In the same way as in Example I a mixture of 94.91 g tetramethylene diamine, 421.58 g hexamethylene diamine, 524 g water, 0.36 g sodium hypophosphite monohydrate, 260,68 g adipic acid and 444.43 g terephthalic acid was stirred in a 2.5 liter autoclave with heating so-that an 90 wt % aqueous salt solution was obtained after 19 minutes. In this process the temperature increased from 170° C. to 206° C. The polymerisation was effected at increasing temperatures of 210° C. to 226° C. for 25 minutes, during which the pressure rose to 1.5 MPa. The prepolymer was subsequently dried and post-condensed in the solid phase in the same way as in Example I, except the post condensation time at 260° C. was 21 hours.

EXAMPLE VI

Preparation of PA-6T/4T/46 (Mole Ratio 74.5/10.0/15.5)

In the same way as in Example I a mixture of 127.09 g tetramethylene diamine, 350.05 g hexamethylene diamine, 487 g water, 0.66 g sodium hypophosphite monohydrate, 91.59 g adipic acid and 567.48 g terephthalic acid was stirred in a 2.5 liter autoclave with heating so-that an 91 wt. % aqueous salt solution was obtained after 22 minutes. In this process the temperature increased from 176° C. to 212° C. The polymerisation was effected at increasing temperatures of 220° C. to 226° C. for 22 minutes, during which the pressure rose to 1.4 MPa. The prepolymer thus obtained was subsequently dried in a drying kiln for several hours heating at 125° C. and 180° C. under vacuum and a stream of nitrogen of 0.02 Mpa. The prepolymer was post-condensed in the solid phase in a metal tube reactor (d=85mm) for several hours heating at 190° C. and 230° C. under a stream of nitrogen (2400 g/h) and than under a stream of nitrogen/water vapour (3/1 weight ratio, 2400 g/h) for 96 hours at 251° C. Then the polymer was cooled to room temperature.

EXAMPLE VII

Preparation of PA-6T/4T/66 (Mole Ratio 65/13/22)

In the same way as in Example I a mixture of 57.42 g tetramethylene diamine, 368.62 g hexamethylene diamine, 546.88 g water, 0.6 g sodium hypophosphite monohydrate, 117.22 g adipic acid and 472.37 g terephthalic acid was stirred in a 2.5 liter autoclave with heating so-that an 91 wt. % aqueous salt solution was obtained after 22 minutes. In this process the temperature increased from 176° C. to 212° C. The polymerisation was effected at increasing temperatures of 220° C. to 226° C. for 22 minutes, during which the pressure rose to 1.5 MPa. The prepolymer thus obtained was subsequently dried in a drying kiln for several hours heating at 125° C. and 180° C. under vacuum and a stream of nitrogen of 0.02 Mpa. The prepolymer was subsequently dried and post-condensed in the solid phase in the same way as in Example I, except the post condensation time at 260° C. was 48 hours.

Comparative Example A

Polyamide 6T/4T (Mole Ratio 60/40)

In the same way as in Example I a mixture of 209.08 g tetramethylene diamine, 282.93 g hexamethylene diamine, 500 g water 0.33 g sodium hypophosphite monohydrate, and 673.99 g terephthalic acid was stirred in a 2.5 liter autoclave with heating so-that an 91 wt. % aqueous salt solution was obtained after 25 minutes. In this process the temperature increased from 179° C. to 220° C. The polymerisation was effected at increasing temperatures of 220° C. to 226° C. for 22 minutes, during which the pressure rose to 1.6 MPa. The prepolymer was subsequently post-condensed in the solid phase in the same way as in Example I except the post condensation time at 260° C. was 45 hours.

Comparative Example B

Polyamide 46

In the same way as in Example I a mixture of 430.4 g tetramethylene diamine, 500 g water, 0.33 g sodium hypophosphite monohydrate and 686.8 g adipic acid was stirred in a 2.5 liter autoclave with heating so-that a 90 wt. % aqueous salt solution was obtained after 25 minutes. In this process the temperature increased from 110° C. to 162° C. The polymerisation was effected at increasing temperatures of 162° C. to 204° C. in during which the pressure rose to 1.3 Mpa. The prepolymer was subsequently dried and post-condensed in the solid phase in the same way as in Example I.

Comparative Example C

Polyamide 46/4T (Mole Ratio 40/60)

In the same way as in Example I a mixture of 444.23 g tetramethylene diamine, 616 g water 0.33 g sodium hypophosphite monohydrate, 301.66 g terephthalic acid and 398.11 g of adipic acid (Aldrich) was stirred in a 2.5 liter autoclave with heating so-that an 90 wt. % aqueous salt solution was obtained after 25 minutes. In this process the temperature increased from 170° C. to 200° C. The polymerisation was effected at increasing temperatures of 220° C. to 226° C. in during which the pressure rose to 1.6 Mpa. The prepolymer thus obtained was subsequently dried in a drying kiln for several hours heating at 125° C. and 180° C. under vacuum and a stream of nitrogen of 0.02 Mpa. The prepolymer was subsequently dried and post-condensed in the solid phase in the same way as in Example I, except the post condensation time at 260° C. was 48 hours.
Injection Moulding.

The polyamides described above were used for making injection moulded parts. For injection moulding the materials were pre-dried prior to use, by applying the following conditions: the copolyamides were heated under vacuum of 0.02 Mpa to 80° C. and kept at that temperature and pressure for 24 hrs while a stream of nitrogen was passed. The pre-dried materials were injection moulded on an Arburg 5 injection moulding machine with a 22 mm screw diameter and a Campus UL 0.8 mm 2 body injection mould. The temperature of the cylinder wall was set at 345° C., and the temperature of the mould was set at 140° C. The Campus UL bars thus obtained were used for further tests. It is noted that extrusion of Comparative Example C gave great difficulties.
Thermal characterisation by DSC, (According to ASTM D3417-97 E793-85/794-85)

Determination of $T_m$ and $T_g$ The measurements of the second melting temperature $T_m$ and glass transition temperature $T_g$ were carried out with a Mettler Toledo Star System (DSC) using a heating and cooling rate of 20° C./min. in an $N_2$ atmosphere. For the measurements a sample of about 5 mg pre-dried powdered polymer was used. The predrying was carried out at high vacuum, i.e. less than 50 mbar and a 105° C. during 16 hrs. The polyamide sample was heated from 20° C. to 360° C. at 20° C./min, immediately cooled to 40° C. at 20° C./min and subsequently heated to 360° C. again at 20° C./min. For glass transition temperature $T_g$ the inflection point in the second heating cycle was determined. For the second melting temperature $T_m$ the peak value of the melting peak in the second heating cycle was determined.

Determination of $T_m$(sat): The measurements of the melting temperature upon saturation $T_m$(sat) were carried out with a Mettler Toledo Star System (DSC) using a heating rate of 5° C./min. The measurement of $T_m$(sat) was carried out on pre-saturated injection moulded samples. Pre-saturation was done by immersing a Campus UL bar made of a polyamide in water for 14 days at 40° C. Then a round sample with a mass of about 15 mg was cut out of the Campus UL bar and put in a high-pressure resistant DSC cup together with about 15 mg of water. For the melting temperature $T_m$(sat) the peak value of the melting peak during the first heating run using a starting temperature of 20° C. and a heating rate of 5° C./min was measured.

Isothermal TGA

Isothermal TGA was performed on a Perkin-Elmer TGA7 thermo balance. About 5 mg predried powdered polymer sample was used (high vacuum, <50 mbar T=105° C. during 16 hrs). The measurement was performed by heating the sample in a Helium atmosphere at 40° C./min from 20° C. to 380° C. and keeping them at 380° C. for 1 hour. The start of heating at 20° C. was taken as time t=0 min. For the period between time t=15 min and t=30 min, the average slope of the TGA curve was determined and expressed as the weight loss, relative to the initial weight in percentage, per minute.

Water Uptake and Diffusion Constant D

Water uptake was determined immersing an injection moulded Campus UL polymer part with a thickness t=0.8 mm and an initial weight (w0) in demineralised water at T=40° C. At regular time intervals the weight at different times (wt) was measured and the weight increase $\Delta W(t)$=(wt−w0) was determined up to the equilibrium water uptake (w∞) with the weight increase $\Delta W\infty$=(w∞−w0). The diffusion constant D was determined according to the Fick law from the slope of the relative weight increase against the square root $t^{1/2}$ of the conditioning time:

$$\text{Slope} = \Delta W(t)/t^{1/2} = (4/l) \cdot (D/\pi)^{1/2} \cdot \Delta W\infty.$$

Hereby the slope was taken from measured data up to $\Delta W(t)/\Delta W\infty = 0.7$.

Relative Viscosity.

The relative viscosity was measured for the polymers obtained by post-condensation. The measurement of the relative viscosity was performed according to ISO 307, fourth edition, For the measurement a pre-dried polymer sample was used, the drying of which was performed under high vacuum (i.e. less than 50 mbar) at 80° C. during 24 hrs. Determination of the relative viscosity was done at a concentration of 1 gram of polymer in 100 ml of sulphuric acid 96.00±0.15% m/m at 25.00±0.05 ° C. The flow time of the solution (t) and the solvent (to) were measured using a DIN-Ubbelohde from Schott (ref. no. 53020) at 25° C. The relative viscosity is defined as t/t0.

The compositions and test results for Examples I-VII and Comparative Experiments A-C have been collected in Table 1.

The results illustrate that the polyamides in the Examples can be obtained with higher viscosities and in shorter times than the semi-aromatic polyamides in the Comparative Experiments. Next to that, though the polyamides in the Examples comprise an amount of polyamide 46 components, which shows a substantial drop in Tm upon saturation in water, the polyamides in the Examples show a much lower drop, which is even lower than that of the semi-aromatic polyamide in Comparative Experiment A. Furthermore, the polyamides in the Examples show a low weight loss rate in the melt close to that of, or even better than the semi-aromatic polyamide in the Comparative Experiment A, which results are surprising in view of the high weight loss rate in the melt for polyamide 46 and better than could be expected on the basis of the content of polyamide 46 in the polyamides in the Examples.

TABLE 1

Compositions and test results of Examples I-VII and Comparative Experiments A-C.

| | EXAMPLES/COMPARATIVE EXPERIMENTS | | | | | | | | | |
|---|---|---|---|---|---|---|---|---|---|---|
| | EX I | EX II | EX III | EX IV | EX V | EX VI | EX VII | CE A | CE B | CE-C |
| Compositions | | | | | | | | | | |
| PA-6T content (mole %) | 74.4 | 67.5 | 67.5 | 60.0 | 60.0 | 74.5 | 78 | 60 | — | — |
| PA-4T content (mole %) | — | 21.3 | — | 21.3 | — | 10 | — | 40 | — | 40 |
| PA-46 content (mole %) | 25.6 | 11.2 | 11.2 | 18.7 | 18.7 | 15.5 | 13 | — | 100 | 60 |
| PA-66 content (mole %) | — | — | 21.3 | — | 21.3 | — | 9 | — | — | — |
| Test results | | | | | | | | | | |
| ηrel - granules | 3.2 | 2.3 | 3.3 | 2.5 | 3.8 | 2.8 | 4.6 | 1.59 | 3.04 | 1.71 |
| Tg (° C.) | 117 | 136 | 107 | 126 | 101 | 128 | 115 | 130 | 80 | 101 |
| Tm2 (° C.) | 305 | 320 | 307 | 316 | 290 | 320 | 317 | 336 | 289 | 314 |
| Tm2-sat (° C.) | 240 | 252 | 244 | 245 | 227 | 251 | 254 | 257 | 184 | 212 |
| Δ (Tm2 − Tm2-sat) (° C.) | 65 | 67 | 62 | 71 | 63 | 68 | 63 | 79 | 105 | 102 |
| Diffusion at 40° C. in H2O (mm$^2$/sec) | 2.7 | 1.6 | 2.3 | 2.9 | 3.5 | 1.7 | 2.0 | 1.6 | 22 | 20 |
| Slope isothermal TGA (wt. %/min) | 0.27 | 0.20 | 0.31 | 0.23 | 0.40 | 0.20 | | 0.27 | 1.70 | 1.33 |

The invention claimed is:

1. A semi-crystalline semi-aromatic polyamide comprising units derived from diamines (A-A units) comprising aliphatic diamine and from dicarboxylic acids (B-B units) comprising terephthalic acid, wherein:
   (a) the dicarboxylic acids consist of a mixture of aromatic dicarboxylic acid and aliphatic dicarboxylic acid, wherein
      (i) the aromatic dicarboxylic acid consists for at least 80 mole % of terephthalic acid, relative to the total amount of aromatic dicarboxylic acid, and
      (ii) the molar amount of the aliphatic dicarboxylic acid is at least 5 mole %, relative to the total amount of dicarboxylic acids, and the aliphatic dicarboxylic acid is chosen from the group consisting of adipic acid (C6), suberic acid (C8), sebacic acid (C10), dodecanoic acid (C12) and mixtures thereof, (b) the diamines consist of a mixture of long chain aliphatic diamine with 6-12 carbon atoms and short chain aliphatic diamine selected from the group consisting of 1,4-butane diamine, 1,5-pentanediamine and mixtures thereof, wherein the molar amount of the short chain aliphatic diamine is at least 10 mole %, relative to the total amount of diamines, and (c) the sum of the molar amount of the aromatic dicarboxylic acid and the long chain aliphatic diamine is 60-90 mole %, relative to the total molar amount of dicarboxylic acids and diamines.

2. The semi-aromatic polyamide according to claim 1, wherein the long chain aliphatic diamine is chosen from the group consisting of hexane diamine, 2-methyl-,1,5-pentanediamine, C8-diamine, C9-diamine, 2-methyl-,1,8-octanediamine, C10-diamine, C11-diamine, C12-diamine and mixtures thereof, preferably hexane diamine, C8-diamine, C9-diamine, C10-diamine and mixtures thereof.

3. The semi-aromatic polyamide according to claim 1, wherein the polyamide comprises units other than A-A and B-B units, in an amount of at most 10 mass %, relative to the total molar mass of the polyamide.

4. The semi-aromatic polyamide according to claim 1, wherein the short chain diamine consists of 1,4-butane diamine.

5. A process for the preparation of a semi-aromatic polyamide comprising a polymerization step wherein dicarboxylic acids comprising terephthalic acid and diamines comprising aliphatic diamine are cocondensed to form a polyamide comprising A-A units and B-B units, and wherein the dicarboxylic acids and diamines have a composition according to claim 1.

6. The process according to claim 5, wherein the polymerization step is a melt or solution polymerization step.

7. A polymer composition comprising a semi-aromatic polyamide according to claim 1 and at least one additive.

8. A molded part which comprises the polymer composition according to claim 7.

9. A molded part which comprises the semi-aromatic polyamide according to claim 1.

10. The molded part according to claim 9, wherein the molded part is an automotive engine part, an electric or electronic component, an aerospace part or a part for household applications.

* * * * *